July 6, 1926.  
H. AUSTIN  
1,591,694  
DRIVING WHEEL OF TRACTORS AND OTHER AGRICULTURAL IMPLEMENTS  
Filed Jan. 19, 1924

Inventor:
Herbert Austin,
By S. M. McColl atty

Patented July 6, 1926.

1,591,694

UNITED STATES PATENT OFFICE.

HERBERT AUSTIN, OF BROMSGROVE, ENGLAND.

DRIVING WHEEL OF TRACTORS AND OTHER AGRICULTURAL IMPLEMENTS.

Application filed January 19, 1924, Serial No. 687,173, and in Great Britain September 29, 1923.

In order to adapt the driving wheels of tractors and other agricultural implements, which are required to be used upon soft and upon hard ground alternatively, and are required either to drive the vehicle they support or to take drive from the ground, as is the case with certain agricultural implements, it is customary to provide the wheels either with a plain surface or with a rubber studded surface for use upon hard ground, and to fit over the permanent tread of the wheel separate spuds or strakes or separate treads or sections of tread carrying spuds or strakes. The fitting of separate spuds or strakes has the disadvantage that a considerable amount of time is required and the fitting of auxiliary lengths of tread carrying spuds or strakes is unsatisfactory because it is difficult to keep the permanent tread of the wheel free from soil, and it is also difficult to keep the inner surfaces of the auxiliary treads free of soil because they necessarily lie about to some extent in the fields and mud and dirt accumulate on the concave inner surfaces of the sections and make them difficult to fit in place. Now the object of this invention is to overcome these difficulties.

According to the present invention, one or each wheel is provided with a permanent tread of rubber or other suitable material for use upon hard ground; and, when the wheel is required for use upon soft ground, there is bolted or otherwise secured thereon, over the rubber or other tread, lengths of auxiliary tread each being of channel section, the inner edges of the channel being bolted or otherwise secured in relation to some permanent part of the wheel, conveniently the rim upon which the rubber or other tread is mounted. The advantage of such an arrangement is that there is no particular tendency for the said rim to become soiled as it stands up some distance from the ground; and, if soil should get into the lengths of channel, it does no harm provided it is clear of the portions which engage against the rim.

Convenient applications of the invention are described with reference to the drawings herewith, of which:—

Referring first to Figures 1 to 4 of the drawings herewith, A is a wheel of the usual disc type provided with a rim B to which the edges of the discs are riveted in any usual manner. Solutioned, or otherwise permanently secured upon the rim B, is a rubber tread C. D is a detachable tread portion of channel shape so arranged as to cover in the rubber tread C and be secured to the rim B. The detachable tread portion D is made up of two side channel pieces $d\ d$ each with outward flanges $e\ f$ and a curved metal strip E to which the flanges $f\ f$ are permanently riveted. The metal strip E is preferably arranged to overhang the normal tread of the wheel as shown and it has spuds or strakes F secured upon its outer surface.

The wheel rim B is arranged to be of such a width as to reach to the outer edges of the flanges $e\ e$ and such flanges may be detachably secured thereto by the detachable bolts $g\ g$.

When the tractor is in use upon soft ground a plurality of lengths of auxiliary tread D are used, bolted to the wheel rim B as above described. When, however, it is desired that the tractor shall run upon hard ground the auxiliary rim sections D are removed by removing the bolts $g$. The sections may either be carried by the tractor or implement in some convenient receptacle, or they may be left upon the ground for further use either by the same tractor or implement or another with similar provision in the wheels.

Figure 1:
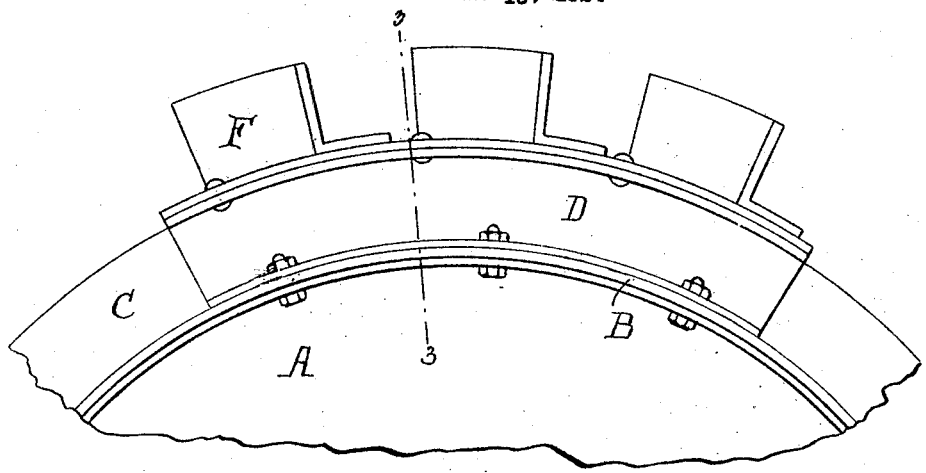
Figure 1 is a fragmentary view in side elevation of a tractor wheel showing bolted thereon one length of auxiliary tread constructed according to this invention.
Figure 2:
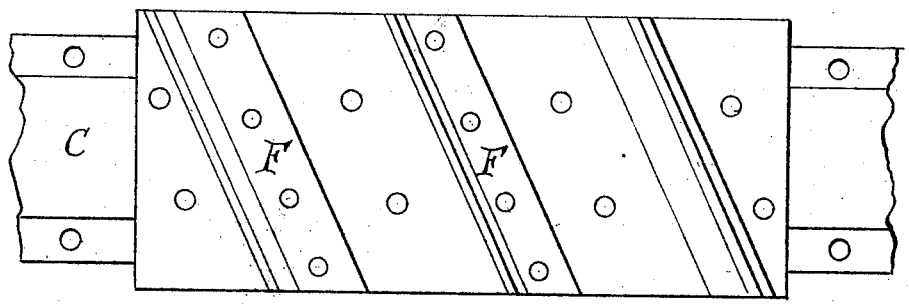
Figure 2 is a plan view of the wheel and tread shown in Figure 1.
Figure 4:
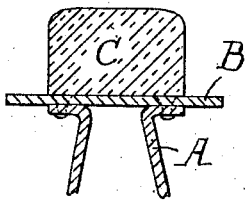
Figure 4 is a view corresponding to Figure 3, but showing a section of the permanent tread of the wheel with the auxiliary tread removed therefrom; and, Figure 5 is a view corresponding to Figure 3, but showing a modification of the means for holding the auxiliary tread section in place.
Figure 3:
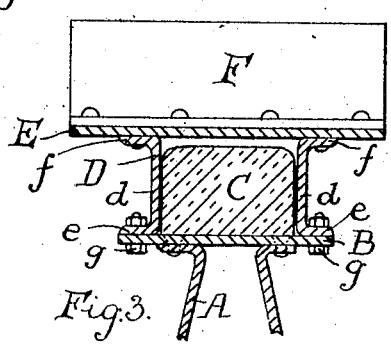
Figure 3 is a transverse section taken on the line 3, 3, of Figure 1.
Figure 5:
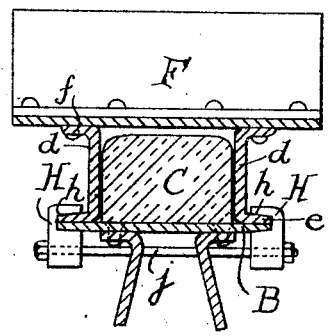

Referring to Figure 5, there is shown an alternative method of clamping the auxiliary rim section to the permanent rim B. In this case blocks H H are provided each having a recess $h$ to receive the corresponding outer edge of the rim B and the outer edge $e$ of the corresponding channel $d$. The blocks H are drawn together in pairs by means of long transverse bolts $j$.

Having fully described my invention, what I claim and desire to secure by Letters Patent is:—

1. In a wheel for a tractor or other agricultural implement required to run alternatively upon soft and upon hard ground, a permanent metal rim, a tread permanently attached thereto, and a set of removable auxiliary rim sections, each permanently of channel shape adapted to bridge over the said tread and be detachably secured to the wheel, said auxiliary rim sections each including a ground engaging portion of greater width than the permanent metal rim and each being adapted to carry spuds or strakes.

2. In a wheel for a tractor or other agricultural implement required to run alternatively upon soft and upon hard ground, a permanent metal rim, a tread permanently attached thereto, said rim extended at either side of said tread, and a set of removable auxiliary rim sections each permanently of channel shape adapted to bridge over the said tread and be detachably secured to the side portions of the said permanent rim, said auxiliary rim sections each including a ground engaging portion of greater width than the permanent metal rim and each being adapted to carry spuds or strakes.

3. In a wheel for a tractor or other agricultural implement required to run alternatively upon soft and upon hard ground, a permanent metal rim, a tread permanently attached thereto, said rim extended at either side of said tread, and a set of removable auxiliary rim sections, each of channel shape adapted to bridge over the said tread and being flanged outwardly at its inner edges, the said flanges being adapted to be detachably secured to the said outwardly extending portions of said permanent rim, said auxiliary rim sections each being adapted to carry spuds or strakes.

4. In a wheel for a tractor or other agricultural implement required to run alternatively upon soft and upon hard ground, a permanent metal rim, a tread permanently attached thereto, said rim extended at either side of said tread and a set of removable auxiliary rim sections, each comprising a curved plate forming part of an auxiliary tread and two curved channel members, said channel members passing down over the sides of the said permanent tread and being secured at their outer flanges to the curved auxiliary tread, and detachably secured at their inner flanges to the side portions of the permanent rim, said auxiliary rim sections each being adapted to carry spuds or strakes.

In witness whereof I have hereunto signed my name this 28th day of December, 1923.

HERBERT AUSTIN.